United States Patent [19]

Kilgore et al.

[11] Patent Number: 5,299,346
[45] Date of Patent: Apr. 5, 1994

[54] FUEL INJECTOR UPPER NEEDLE GUIDE BURNISHING AND ALIGNMENT TOOL

[75] Inventors: David C. Kilgore, Yorktown; Thomas F. Gosnell, Sr., Seaford, both of Va.

[73] Assignee: Siemens Automotive L.P., Auburn Hills, Mich.

[21] Appl. No.: 21,930

[22] Filed: Feb. 24, 1993

[51] Int. Cl.⁵ .............................................. B23P 11/00
[52] U.S. Cl. ...................... 29/33 K; 29/465; 29/566; 29/890.142
[58] Field of Search ............ 29/33 K, 566, 465, 467, 29/890.142, 890.126, 89.5, 90.3

[56] References Cited

U.S. PATENT DOCUMENTS

| | | | |
|---|---|---|---|
| 4,790,055 | 12/1988 | Raufeisen et al. | 29/890.142 |
| 4,974,312 | 12/1990 | Yokoyama et al. | 29/467 X |
| 5,127,156 | 7/1992 | Yokoyama et al. | 29/890.142 X |

*Primary Examiner*—Z. R. Bilinsky
*Attorney, Agent, or Firm*—George L. Boller; Russel C. Wells

[57] ABSTRACT

An apparatus is used to align, burnish, and secure an upper needle guide for a fuel injector valve body. The apparatus includes a lower portion having a fixture containing a spring-loaded plunger and a spring-loaded centering pin, and an upper portion having a burnishing tool, a spring-loaded stripper, and a crimping ram. The fixture aligns the needle guide and the valve body, and as the two portions are operated closed, the inside diameter of the upper needle guide is first burnished, and then the valve body is crimped onto the needle guide. The stripper holds the crimped parts against the lower portion of the apparatus while the upper and lower portions are operated open to withdraw the burnishing tool from the inside diameter of the needle guide.

6 Claims, 3 Drawing Sheets

FUEL INJECTOR UPPER NEEDLE GUIDE BURNISHING AND ALIGNMENT TOOL

Field of the Invention

This invention relates to apparatus for manufacturing fuel injectors of the type that are used to inject liquid fuel into the induction system of an internal combustion engine, and particularly to apparatus that during the execution of a closing stroke performs certain operations on a fuel injector valve body member and an upper needle guide including aligning the upper needle guide with a counterbore in the valve body member for a lower needle guide, burnishing the inside diameter (I.D.) of the upper needle guide, and staking the upper needle guide to the valve body member.

BACKGROUND AND SUMMARY OF THE INVENTION

The movement of certain electrically-operated valves, such as certain fuel injectors, comprises a needle that is reciprocated axially within the interior of the valve's body in response to electrical energization and de-energization of an associated electro-mechanical actuator to thereby selectively open and close a flow path through the valve. The needle is guided by an upper needle guide and a lower needle guide which are disposed spaced apart in a through-bore of a valve body member. These needle guides are essentially flat circular washers.

For assuring proper operation and avoiding leakage when the flow path is closed, the alignment of the upper and lower needle guides is critical. Lack of precision in alignment and guidance of the needle is apt to lead to a loss of performance. For example, objectionable leakage or needle jamming may result if alignment of the needle guides and their fit to the needle are not precisely controlled. Burnishing the I.D. of the upper needle guide improves precision of the fit of the needle to the upper needle guide.

The process of manufacturing the fuel injector comprises machining the through-bore of the valve body member so as to insure substantial concentricity of respective cylindrical axial surfaces within which the respective needle guides are to be disposed. Also machined to insure their perpendicularity to the co-axis of these cylindrical axial surfaces are respective circular radial surfaces which adjoin the respective cylindrical axial surfaces and against which the respective needle guides are to be disposed. Enough diametral clearance between the O.D. of the upper needle guide and the cylindrical axial surface within which it is disposed in the valve body through-bore is provided to allow the upper needle guide to float radially as it is being aligned. Once it has been aligned, its I.D. is burnished, and then it is staked in place on the valve body member.

In accordance with the invention, the apparatus includes relatively movable upper and lower portions that are operated closed and then opened. The lower portion has a fixture comprising means for aligning the valve body member to the apparatus and means for aligning the upper needle guide to the cylindrical axial surface of the valve body member that is subsequently to receive the lower needle guide. The upper portion has a tool means that performs multiple functions, one, a burnishing tool to burnish the I.D. of the upper needle guide once the latter has been aligned by the lower portion of the apparatus, two, a crimping tool to crimp the valve body member to the aligned and burnished needle guide, and three, a spring-loaded stripper that holds the upper needle guide on the valve body member during the crimping operation and that holds the assembled upper needle guide member and valve body member against the lower tooling portion while the burnishing tool is being retracted.

The invention, and the features, advantages, and benefits that characterize it, are disclosed in the following detailed description of a presently preferred embodiment that illustrates the best mode for carrying out the invention. The description is accompanied by drawings.

BRIEF DESCRIPTION OF THE DRAWINGS

FIG. 1A is an enlarged fragmentary portion of FIG. 1 by itself.

DESCRIPTION OF THE PREFERRED EMBODIMENT

Figure 1:
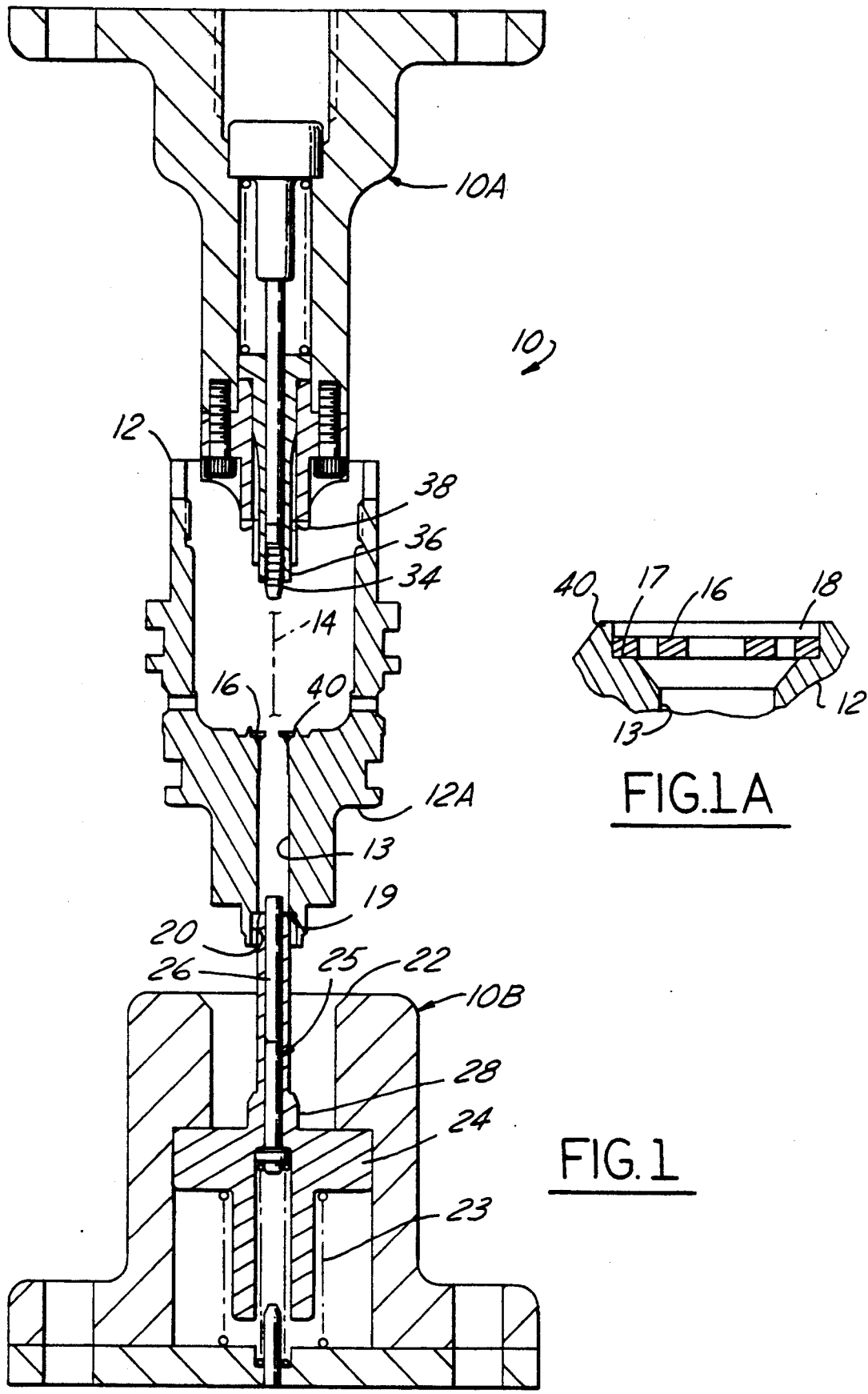
FIG. 1 is a longitudinal cross sectional view of an exemplary burnishing and alignment tool embodying principles of the invention and illustrative a first position preparatory to processing a tubular number of a fuel injector valve body.
Figure 2:
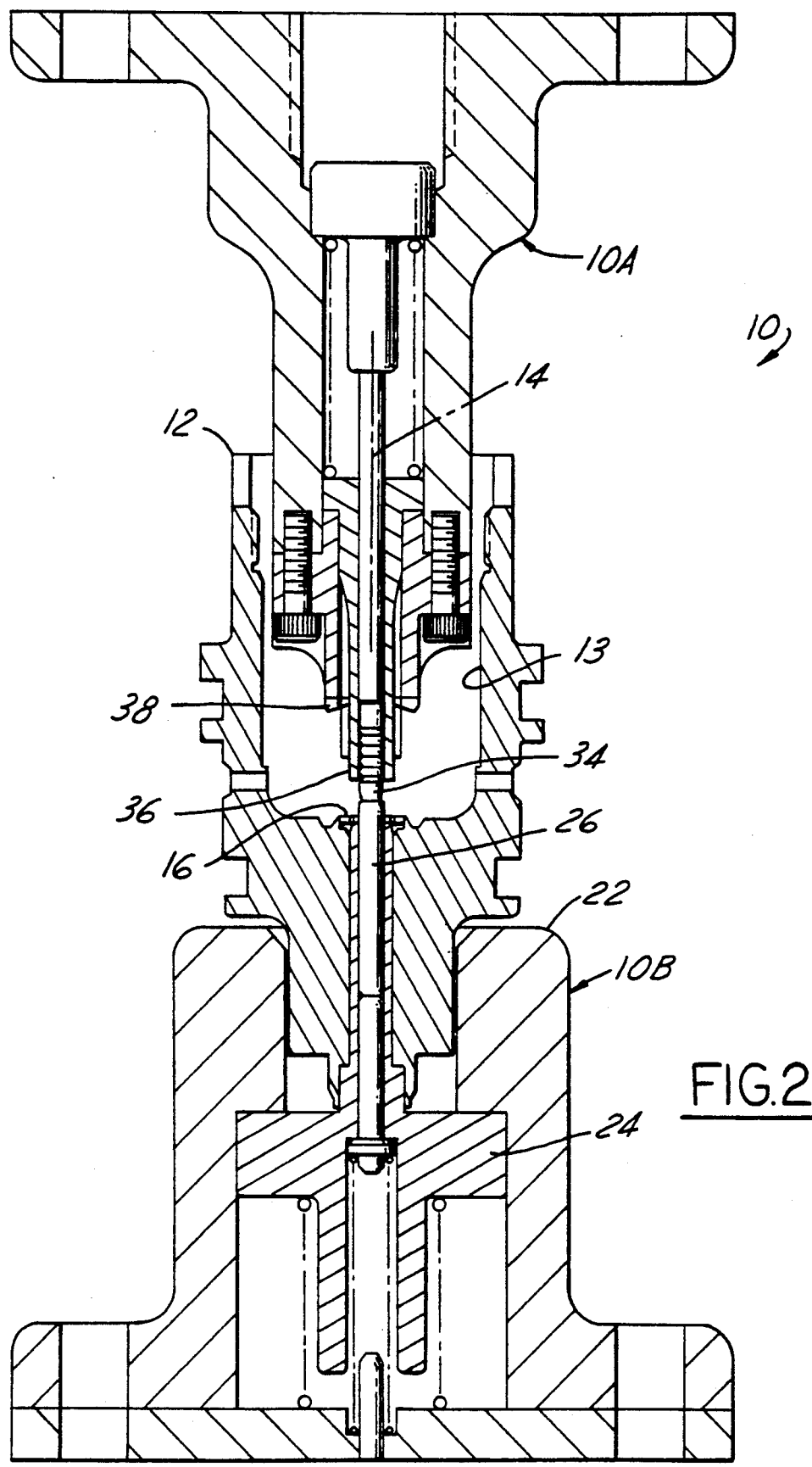
FIG. 2 is a longitudinal cross sectional view similar to FIG. 1 showing a second subsequent position.
Figure 3:
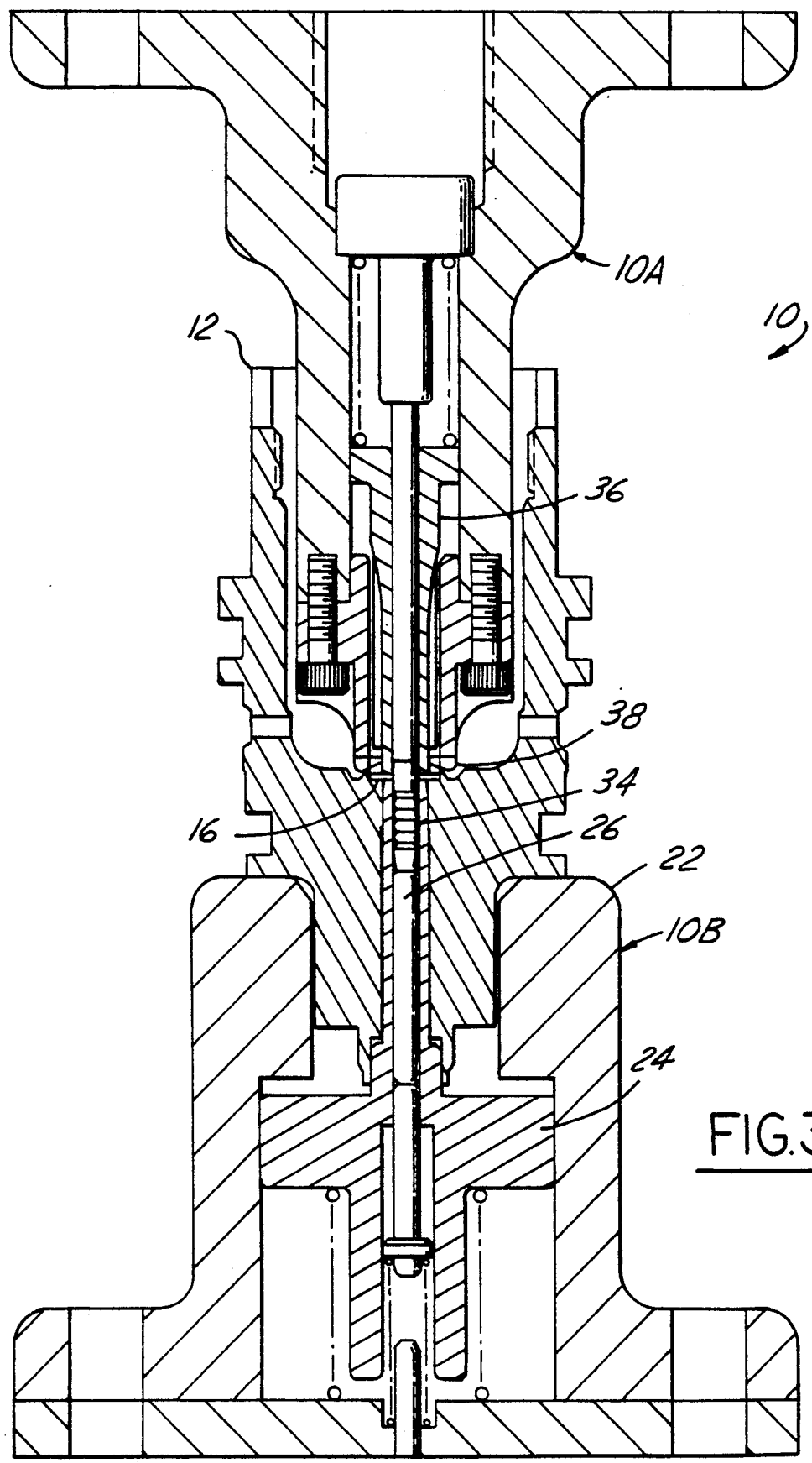
FIG. 3 is a longitudinal cross sectional view similar to FIGS. 1 and 2 showing a third subsequent position.

FIGS. 1, 2 and 3 illustrate a cylindrical valve body member 12 of a representative fuel injector in various stages of processing by an apparatus 10 according to the present invention. Body member 12 is preferably a non-magnetic material, such as non-magnetic stainless steel, and comprises a through-bore 13 having a longitudinal axis 14. An upper needle guide 16 is shown disposed on body member 12 substantially co-axial with axis 14. Upper needle guide 16 is a circular metal washer of uniform thickness. In FIGS. 1 and 1A it is shown disposed flat against a flat radial surface 17 of body member 12 that is adjacent a cylindrical axial surface 18 of through-bore 13, both of said surfaces having previously been machined such that surface 17 is perpendicular to axis 14, and surface 18 is parallel and co-axial with axis 14. The diameter across surface 18 is slightly larger than the O.D. of upper needle guide 16 to allow the latter to float radially to a limited extent as it is being aligned. In the completed fuel injector which is not shown in the drawings, a needle (also not shown) is guided by upper needle guide 16 and a lower needle guide (also not shown). When assembled into valve body member 12, the lower needle guide is disposed at the lower end of through-bore 13 in a counterbore that comprises a flat radial surface 19 that is adjacent a cylindrical axial surface 20, both of said surfaces having previously been machined on valve body member 12 such that surface 19 is perpendicular to axis 14, and surface 20 is parallel and co-axial with axis 14.

Apparatus 10 performs three functions in the manufacturing of a fuel injector: it aligns upper needle guide 16 with the counterbore surface 20; it burnishes the upper needle guide's I.D.; and it stakes the upper needle guide and the valve body member together. Apparatus 10 comprises an upper portion 10A and a lower portion 10B. These portions are relatively reciprocated along the direction of axis 14 to execute closing and opening strokes.

Before a valve body member 12 and an upper needle guide 16 are to be processed by apparatus 10, the two portions 10A and 10B are in full open position. Valve body member 12 is disposed between portions 10A and 10B in the manner of FIG. 1 although it is to be appreciated that FIG. 1 shows the two portions 10A, 10B to have been somewhat relatively advanced toward each other from full open position, and valve body member 12 is not seated on lower portion 10B. (A seated position of part 12 on lower portion 10B is shown in FIG. 2.)

Lower portion 10B comprises a fixture 22 for supporting valve body member 12 in the manner of FIGS. 2 and 3. Fixture 22 contains two spring-loaded mechanisms, one of which 23 comprises a plunger 24 that is axially guided on the interior of fixture 22 and the other of which 25 comprises a centering pin 26 that is axially guided on plunger 24. Normally, the upper tip end of centering pin 26 protrudes slightly from the upper tip end of plunger 24.

An axially intermediate portion of plunger 24 comprises a cylindrical gauging surface 28 for centering valve body member 12 on apparatus 10 by engagement with surface 20 to align axis 14 with the apparatus. Thus, when valve body member 12 is displaced downwardly from the FIG. 1 position to seat on lower tooling portion 10B, gauging surface 28 fits to the counterbore 19, 20 in the lower end of through-bore 13. The act of downwardly displacing valve body member 12 from the FIG. 1 to the FIG. 2 position to seat it on lower portion 10B also serves to cause centering pin 26 to fit into the center guide hole (i.e. I.D.) of guide 16 and guide 16 to be slightly lifted off surface 17 by the upper tip end of plunger 24. Because pin 26 is precisely centered to gauging surface 28 which is itself precisely centered to the counterbore in the lower end of through-bore 13, upper needle guide 16 is thus precisely centered with surface 20.

FIG. 2 shows the relative positions just prior to the burnishing step. Upper portion 10A of apparatus 10 comprises a centrally disposed burnishing tool 34 that is fixedly mounted on upper portion 10A in alignment with pin 26. Burnishing tool 34 is surrounded by a spring-biased stripper 36. FIG. 2 shows the lower tip end of the burnishing tool having just contacted the upper tip end of pin 26 as upper portion 10A is closing on lower portion 10B. Continued closing of the two portions 10A, 10B causes the burnishing tool to pass through the I.D. of upper needle guide 16, burnishing it in the process. During this continued closing, the spring-loaded mechanism comprising pin 26 is pushed downwardly relative to plunger 24, accompanied by some downward motion of plunger 24 against its spring until a shoulder 12A of member 12 abuts the top of fixture 22, and the lower tip end of stripper 36 engages needle guide 16. At some point just prior to full closure of apparatus 10, a condition represented by FIG. 3 is reached. In this position needle guide 16 has been forced flat against surface 20 and is being held there by stripper 36, and the distal end of a ram 38 is poised to engage the top edge of a short tapered wall 40 that bounds surface 18. The final increment of closing motion after FIG. 3 crimps the top of this wall over and against the outer margin of needle guide 16 thus securely staking the needle guide and valve body member together. The two portions 10A and 10B are now opened.

As portion 10A moves away from portion 10B, both ram 38 and burnishing tool 34 move upwardly. Stripper 36 initially however does not, but rather remains spring-biased against needle guide 16 to hold the assembled needle guide and valve body member against lower portion 10B. After the opening of the apparatus has progressed to a point where burnishing tool 34 has withdrawn from needle guide 16, stripper 36 releases. When the portions 10A and 10B have been fully opened, the assembly comprising parts 12 and 16 can be removed.

Having described the invention in detail and by reference to the preferred embodiment thereof, it will be apparent that other modifications and variations are possible without departing from the scope of the invention defined in the appended claims.

What is claimed is:

1. Apparatus for aligning one needle guide of a fuel injector valve body member with a counterbore in such a valve body member that is to receive another needle guide, said apparatus comprising:

upper and lower portions that are relatively openable and closeable;

one of said portions comprising fixture means for fixturing such a valve body member, including a gauging surface for such a counterbore of such a valve body member to center such a valve body member on the apparatus, and centering means for receiving and centering such a one needle guide relative to such a valve body member preparatory to assembling the latter and former together; and the other of said portions comprising tool means for burnishing an inside diameter of such a one needle guide and for crimping such a one needle guide and such a valve body member together.

2. Apparatus as set forth in claim 1 in which said tool means comprises a burnishing tool for burnishing the inside diameter of such a one needle guide and a crimping tool for crimping such a one needle guide and such a valve body member together.

3. Apparatus as set forth in claim 2 further including a spring-loaded stripper for holding such a one needle guide and such a valve body member together preparatory to their being crimped together and for holding such a valve body member and such a one needle guide against said one portion after such a one needle guide and valve body member have been crimped together.

4. Apparatus as set forth in claim 2 in which said centering means is spring-loaded, and a tip end of said burnishing tool engages a tip end of said centering means before the beginning of such burnishing and pushes said centering means out of the inside diameter of such a one needle guide, said spring-loaded centering means pushing against the tip end of said burnishing tool as said burnishing tool is being withdrawn from such a one needle guide.

5. Apparatus as set forth in claim 1 in which said gauging surface is disposed on a spring-loaded plunger that is guided for relative movement on said fixture means.

6. Apparatus as set forth in claim 5 in which said centering means comprises a spring-loaded pin that is guided for relative movement on said plunger.

* * * * *